3,355,379
POLY-ALPHA-OLEFIN DEWAXING AID
Joseph J. Leonard, Houston, Tex., assignor to Shell Oil Company, New York, N.Y., a corporation of Delaware
No Drawing. Filed Sept. 8, 1965, Ser. No. 485,937
5 Claims. (Cl. 208—33)

ABSTRACT OF THE DISCLOSURE

An improved process for solvent dewaxing a hydrocarbon oil is realized by adding to the hydrocarbon oil-dewaxing solvent mixture a minor portion of a poly-alpha-olefin having an average molecular weight of 1.0 to $4.0 \times 10^7$ followed by chilling the mixture and separating the precipitated wax from the oil.

---

This invention relates to the separation of oil and wax from wax-oil mixtures. More particularly, the invention relates to the use of a dewaxing aid to improve the efficiency of the separation of a wax from a wax-containing hydrocarbon oil.

In a conventional process for removing wax from oil, the wax-bearing oil is dissolved in a solvent or solvent mixture at an elevated temperature and then the wax-oil-solvent solution is chilled to a sufficiently low temperature to effect precipitation or solidification of the wax. Following chilling, the precipitated wax is separated from the diluted oil by centrifuging, settling, or filtering. To a great extent, the capacity at which wax-containing oil mixtures can be separated depends upon the rate and effectiveness of the filtration step.

In the past, many expedients have been employed to improve the effectiveness of filtration in wax-oil separation. One of the most common techniques in this field involves the employment of substances which are added to an oil and solvent mixture and which are known in the art as "wax modifiers," "wax conditioners," "wax separation aids" or "filtration aids." Vast numbers of compounds of widely varying chemical types have been investigated or utilized to prevent blocking of the filters by the wax crystals, increase rate of filtration, etc. Among the many addends which have been previously employed as filtration aids has been that class of substances generally referred to as pour point depressants. These materials, which may be naturally occurring or synthetically produced, function as filtration aids, presumably (although the exact theory is not well defined) based on an ability to modify the structure of wax crystals.

Recently, however, it has been discovered that while many of the well known pour depressants previously suggested as filtration aids have given some improvement, they have not proved entirely satisfactory and considerable difficulty in their use has been experienced for various reasons. Many of these wax separation aids are particularly ineffective when a haze-free oil is required to be produced, since the aid often results in a dewaxed oil which develops a haze on standing. Moreover, often the wax cake produced is not firm or dry in appearance, and is produced only after a relatively high solvent-to-oil ratio is employed and after relatively large amounts of the expensive pour depressant is used. Another drawback is the fact that certain wax modifying agents actually require the injection of certain types of waxy material to maintain good filtration rates. A further essential requirement, which many of the prior art processes employing filtration aids fail to possess, is the ability to maintain a low pressure differential across the wax filter cake while operating at constant filtrate flow rate.

Another problem is the relatively large amount of additive (which naturally increases the cost of the produced wax and/or of dewaxing oil) which is sometimes needed to effectively dewax an oil and produce a high quality dewaxed oil, and at the same time not result in unduly slow filtration rates and high solvent requirements.

All of the above problems are particularly acute when the mineral oil being refined is a residual high pour point lubricating oil. By a residual high pour point oil is meant a paraffin hydrocarbon mineral oil which contains some normal paraffinic waxes in the $C_{16}$ and higher carbon number range and more particularly those oils containing at least some normal paraffinic waxes of $C_{20}$ and higher carbon number components.

In accordance with the present invention, applicants have discovered a process for solvent dewaxing of a mineral oil which involves mixing a conventional dewaxing solvent and certain poly-alpha-olefins (as hereinafter described), chilling the mixture to precipitate wax, and separating the wax from the oil. By utilizing the poly-alpha-olefins in conjunction with the dewaxing solvent the difficulties referred to in the preceding paragraphs are either obviated or minimized. It has thus been found that when poly-alpha-olefins are employed in the present solvent dewaxing process, improved separability, filter rate and yields of wax and oils are obtained. The process, moreover, results in a clear, substantially haze-free dewaxed oil being produced and is one wherein a low pressure differential can be maintained across the filter cake at constant filtrate flow rate.

The use of the instant filtration aid has been found to produce a haze-free residual oil and to effect an increase in filtration rate while using substantially lower proportions of the filtration aid than most previously known aids. It has also been found possible when using these filtration aids to reduce the ratio of dewaxing solvent to oil. These last two improvements result in the possibility of higher throughput in a given size of dewaxing plant, thus resulting in substantially greater efficiency. It has also been found that the use of the present filtration aids result in a wax cake exhibiting improved washing characteristics due to the lower resistance offered by the cake to wash solvent flow. The result is an improved quality wax and an increase in dewaxed oil yield.

Certain linear polymerized poly-alpha-olefins, i.e., alpha-olefins having a molecular weight between about $1.0 \times 10^5$ and about $1.0 \times 10^6$ and bearing alkyl substituent side chains of an average chain length of 11–13, have been effectively employed as pour point depressant compositions.

It has now been found that certain other polymerized alpha-olefins, i.e., alpha olefins having a molecular weight between about $1.0 \times 10^7$ and about $4.0 \times 10^7$ and bearing alkyl substitutent side chains on the linear "backbone" chain, having an average chain length of 13–17 and preferably 14–15, are unexpectedly effective as dewaxing aids where employed in amounts from about 0.01 to 1.0% by weight and preferably 0.05 to 0.5% by weight.

The polymers utilized for the present invention may be prepared by a number of different processes, but the most satisfactory polymerizing process comprises the polymerization of alpha-olefins having from 2 to 22 carbon atoms each, using one of two preferred processes.

In one process, it is preferred to conduct the initial polymerization in the presence of an aluminum trialkyl in the substantial absence of any catalyst promoter. Under these conditions, the polymers obtained are dimers of the monomer and varying amounts of higher polymers generally within the range of 10 to 22 carbon atoms per average polymer molecule. Subsequent to the preparation of this relatively low molecular weight polymerization mixture, the reaction product is subjected to partial distillation or vaporization whereby the fractions of the products boiling below about decene are removed and thereafter adding to the residual portions of the reaction mixture a catalyst promoter such as titanium tetrachloride, thus causing intensive polymerization of the residual portion to occur resulting in extremely high molecular weight polymers.

In the second process, a single stage polymerization process is to be utilized, namely, when the aluminum trialkyl catalyst is combined in the initial phase with a catalyst promoter such as a variable valence metal compound, e.g., titanium tetrachloride, the alpha-olefins to be utilized should have between about 10 and about 22 carbon atoms per molecule.

The metal trihydrocarbyls which may be used in this type of polymerization are preferably aluminum trialkyls containing from 1 to 18 carbon atoms per alkyl radical. However, other hydrocarbon substituents may be utilized, such as aryl or alkaryl radicals as well as aralkyl radicals. These hydrocarbyl radicals should preferably contain from 1 to 6 carbon atoms each. The lower aluminum trialkyls wherein each alkyl radical contains from 2 to 4 carbon atoms each are preferred. These include aluminum triethyl, aluminum tripropyl, aluminum triisobutyl, aluminum trimethyl, aluminum triphenyl, aluminum tribenzyl, aluminum trixylyl, aluminum diethylmethyl, aluminum diethylisobutyl, aluminum phenyldiethyl, aluminum tricycloalkyls such as aluminum tricyclohexyl, and the like. The proportion of aluminum trihydrocarbyl to alpha-olefin may vary from about 0.1 to about 0.01 mole per mole of olefin. In place of aluminum, other metals such as zinc or magnesium, beryllium, indium or gallium may be used. Aluminum dialkylchlorides may be used in place of aluminum trialkyls.

The alpha-olefins useful in the production of the subject class of high molecular weight polymers are those having from 2 to 22 carbon atoms per molecule and comprise alpha-olefins (preferably normal) such as ethylene, propylene, butylene, octene-1, decene-1, dodecene-1, tetradecene-1, hexadecene-1, octadecene-1 and eicosene-1.

The particular dewaxing solvent employed may be any of those solvents conventionally employed in the art. Among those which may be suitable are the polar solvents, for example, ketones, such as methyl ethyl ketone, acetone, etc.; alcohols such as butyl, amyl, propyl alcohol, etc.; ethers such as diethyl ether, isopropyl ether, etc.; chlorinated hydrocarbons such as ethylene dichloride, trichloroethylene, etc.; mixtures of any one or more of the above solvents with an aromatic solvent such as benzene, toluene, etc. Particularly desirable as a dewaxing solvent or diluent are the low molecular weight hydrocarbons, such as ethane, propane, butane, isobutane, etc., and the one preferred for the process of the instant invention is propane.

In general, the amount of dewaxing solvent to be employed is that amount which keeps the oil in solution at the dewaxing temperature, but which does not dissolve an appreciable amount of wax. In the instant process, the proportions of solvent to wax containing feed stock may vary, but a preferred operating range is from about .5 volume to about 4.5 volumes of solvent per volume of wax containing mineral oil. Of course, proportions of dewaxing solvent to the waxy oil will depend upon the wax content of the oil, the viscosity of the oil and the temperature and other operating conditions of the dewaxing process.

The hydrocarbon charge stocks which may be utilized as the feed may be any wax-containing mineral oil, but particularly desirable are feed stocks which contain at least some normal paraffinic waxes in the $C_{16}$ and higher carbon number range, and more particularly, those oils containing at least some normal paraffinic wax components of $C_{20}$ and higher carbon numbers. Among the hydrocarbon feeds for which the present invention is applicable are raffinates which result from deasphalted short residue stocks and distillates. One example of such a feed stock is a 250 sour distillate raffinate as shown in Table I.

A preferred manner of practicing the invention comprises adding the poly-alpha-olefins to the waxy charge oil and then subsequently combining the modified oil with dewaxing solvent. Alternatively, the three components may be injected separately into a mixing device such as a pipeline or tank or the oil and solvent may first be mixed after which the polymer may be added.

In order to ensure complete dispersal of the waxy oil in the dewaxing solvent, it is generally desirable to heat the mixture to a temperature usually in the range of 115–195° F. Thereafter, the mixture is cooled such as by indirect heat exchange with water or cold filtrate oil (filtrate oil plus solvent) to a dewaxing temperature usually in the order of 0 to −45° F., dependent upon the specific wax and oil stock being treated. After precipitation of the wax by this procedure, the wax is then separated from the oil either by filtration or centrifuging. Subsequent to this, the wax is washed with the same or a different oil solvent for the purpose of removing oils still adhering to the wax particles. The solvent is then separated from oil either by simple flashing or by distillation.

The outstanding effects achieved by the use of the present dewaxing aids are clearly illustrated by the results set forth below in Table I.

TABLE I.—PROPERTIES OF POLY-ALPHA-OLEFINS AND THEIR EFFECTIVENESS AS DEWAXING AIDS

| | Mol. Weight Estimated | Av. Side Chain Length | Crystals Settled After 20 Minutes, Percent Vol. Sour 250 Raff. | |
|---|---|---|---|---|
| | | | 0.01% w.[a] | 0.05% w. |
| Octadecene$_1$Dodecene$_2$Propylene | $1.15 \times 10^5$ | 9 | 6.6 | 5.8 |
| Octadecene$_2$Dodecene$_4$Pentene$_3$ | $>10^6$ | 9 | 8.1 | 5.8 |
| Octadecene$_2$Dodecene$_4$Octene$_3$ | $8.5 \times 10^5$ | 10 | 6.6 | 5.2 |
| Octadecene$_3$Dodecene$_2$Decene$_2$ | $4.4 \times 10^5$ | 12 | 7.2 | 11.5 |
| Octadecene$_2$Dodecene$_1$ | $1.45 \times 10^5$ | 13 | 7.8 | 25.3 |
| Octadecene$_2$Dodecene$_1$ | $2.65 \times 10^5$ | 14 | 9.2 | 38.8 |
| Octadecene$_1$Dodecene$_1$ | $2.0 \times 10^7$ | 13 | 21.6 | 59.5 |
| Octadecene$_2$Dodecene$_1$ | $1.6 \times 10^7$ | 14 | 35.9 | 52.3 |
| Octadecene$_{2.33}$Dodecene$_1$ | $1.8 \times 10^7$ | 14.4 | 34.8 | 58.6 |
| Alfene 16–18 | $3.5 \times 10^7$ | 14.7 | 31.9 | 52.0 |
| Octadecene$_4$Dodecene$_1$ | $2.3 \times 10^7$ | 14.8 | 33.0 | 64.4 |
| Alfene 20 | $1.2 \times 10^6$ | 17.9 | 13.5 | 10.6 |

[a] Percent weight additive.

From the above, it is apparent that these specific polymerized poly-alpha-olefins are effective dewaxing aids, particularly in the dewaxing of 250 distillate raffinate. The replacement of 1% by weight of a commercial dewaxing aid in the charge oil with only 0.02% by weight of the copolymer octadecene-dodecene, yields equivalent filtration rates and comparable dewaxed oil quality. Furthermore, at an additive concentration of 0.05% by weight copolymer octadecene-dodecene, it has been found possible to reduce the solvent to feed volume ratio from greater than 4.5 as previously required to 3.0 and still produce a specific oil at good filtration rates. Thus, when compared to other commercial dewaxing agents at equal concentrations:

(a) solvent to feed ratios can be lowered thus reducing operating costs and allowing increased intakes to commercial plant;

(b) filtration rates are improved due to the formation of a more solid crystalline wax cake or reduced capital and operating costs due to a fewer number of filters that are required to maintain a given throughput;

(c) improved cake washing due to the lower resistance offered by the cake to propane wash resulting in an improved quality wax and an incerase in dewaxed oil yield;

(d) since polymerized alpha-olefins are saturated alkane hydrocarbons, the filtration aid can therefore be left in the wax to enhance physical properties, particularly if excessive amounts should be employed even if the wax is to be used for food packaging.

I claim as my invention:

1. A process for solvent dewaxing a hydrocarbon oil comprising mixing said oil with a dewaxing solvent and from 0.01 to 1.00% by weight of a poly-alpha-olefin having an average molecular weight of 1.0 to $4.0 \times 10^7$, chilling the mixture to precipitate wax, and passing said mixture to a filter whereby the precipitated wax is separated from the oil.

2. A process in accordance with claim 1 wherein the dewaxing solvent is propane.

3. A process in accordance with claim 2 wherein the propane is employed in an amount from about .5 to 4.5 volumes based on the oil.

4. A process in accordance with claim 1 wherein said oil contains at least some normal paraffinic waxes having at least 16 carbon atoms.

5. A process in accordance with claim 4 wherein said oil is a lubricating oil stock.

References Cited
UNITED STATES PATENTS

| | | | |
|---|---|---|---|
| 2,895,915 | 7/1959 | Hewett et al. | 252—59 |
| 2,949,418 | 8/1960 | Jezl | 208—31 |
| 3,151,181 | 9/1964 | Hewitt et al. | 252—59 |

DANIEL E. WYMAN, *Primary Examiner.*

P. E. KONOPKA, *Assistant Examiner.*